United States Patent
Ahire et al.

(10) Patent No.: US 11,546,353 B2
(45) Date of Patent: Jan. 3, 2023

(54) DETECTION OF MALICIOUS ACTIVITY ON CAN BUS

(71) Applicant: Toyota Motor North America, Inc., Plano, TX (US)

(72) Inventors: Sachin J. Ahire, Frisco, TX (US); Ryan Wiesenberg, Ann Arbor, MI (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 597 days.

(21) Appl. No.: 16/516,007

(22) Filed: Jul. 18, 2019

(65) Prior Publication Data
US 2021/0021610 A1  Jan. 21, 2021

(51) Int. Cl.
H04L 29/06 (2006.01)
H04L 9/40 (2022.01)
H04L 67/12 (2022.01)
H04L 12/40 (2006.01)

(52) U.S. Cl.
CPC .... *H04L 63/1416* (2013.01); *H04L 12/40032* (2013.01); *H04L 63/1425* (2013.01); *H04L 67/12* (2013.01); H04L 2012/40215 (2013.01); H04L 2012/40273 (2013.01)

(58) Field of Classification Search
CPC .......... H04L 12/40032; H04L 63/1416; H04L 63/1425; H04L 67/12
See application file for complete search history.

(56) References Cited

U.S. PATENT DOCUMENTS 9,031,710 B2  5/2015 Barrett
9,134,955 B2  9/2015 Healey et al.
9,525,700 B1  12/2016 Malinowski et al.
9,616,828 B2  4/2017 Ben Noon et al.
9,646,156 B2  5/2017 Yan et al.
(Continued)

FOREIGN PATENT DOCUMENTS

WO  WO 2016/046819  3/2016

OTHER PUBLICATIONS

Zhang et al. "Defending Connected Vehicles Against Malware: Challenges and a Solution Framework"; IEEE Internet of Things Journal; vol. 1, No. 1, pp. 10-21; Feb. 2014.
(Continued)

*Primary Examiner* — Jeffrey C Pwu
*Assistant Examiner* — Thong P Truong
(74) *Attorney, Agent, or Firm* — Snell & Wilmer LLP

(57) ABSTRACT

Methods, systems, and apparatus for a threat detection system. The threat detection system includes a threat forensics platform. The threat forensics platform includes a memory. The memory is configured to store a baseline model of controller area network (CAN) data. The threat forensics platform includes a processor coupled to the memory. The processor is configured to obtain CAN data including multiple messages. The processor is configured to compare the CAN data including the multiple messages with the baseline model. The processor is configured to determine a threat score for the CAN data based on the comparison and determine that there is a threat within the CAN data based on the threat score. The processor is configured to provide an indication that there is the threat to a driver of a vehicle or to a service provider.

19 Claims, 5 Drawing Sheets

(56) References Cited

U.S. PATENT DOCUMENTS

| | | |
|---|---|---|
| 9,813,436 B2 | 11/2017 | Moeller et al. |
| 9,965,636 B2 | 5/2018 | Litichever et al. |
| 2013/0145482 A1 | 6/2013 | Ricci et al. |
| 2015/0113638 A1* | 4/2015 | Valasek ................ G06F 21/562 726/22 |
| 2016/0019389 A1* | 1/2016 | Yan .................... H04W 12/128 726/23 |
| 2016/0205194 A1* | 7/2016 | Kishikawa .............. H04L 63/10 726/1 |
| 2018/0012091 A1* | 1/2018 | Ricci ...................... G05B 15/02 |
| 2018/0013569 A1 | 1/2018 | Knopf |
| 2018/0241727 A1 | 8/2018 | Verzun et al. |
| 2018/0316699 A1 | 11/2018 | David et al. |
| 2019/0036946 A1* | 1/2019 | Ruvio .................... H04W 4/44 |

OTHER PUBLICATIONS

Avatefipour et al. "State-of-the-Art Survey on In-Vehicle Network Communication CAN-Bus Security and Vulnerabilities"; 8 pages; Feb. 5, 2018.

Loukas et al. "Cloud-Based Cyber-Physical Intrusion Detection for Vehicles Using Deep Learning" IEEE Access; vol. 6; pp. 3491-3508; Dec. 11, 2017.

* cited by examiner

DETECTION OF MALICIOUS ACTIVITY ON CAN BUS

BACKGROUND

Field

This disclosure relates to the detection and notification of malicious activity.

Description of the Related Art

Modern vehicles have many electronic control units for various subsystems. The electronic control units control various devices, such as the transmission, sensors, airbags, antilock braking, steering, audio devices, windows and other apparatuses, subsystems and devices. These various devices communicate and provide feedback among each other and may need to control actuators and/or receive feedback from sensors. The various devices include different microcontrollers, actuators, and/or sensors that may use a controller area network (CAN) bus to communicate with each other in applications without a host computer. The use of the CAN bus allows for the various devices to interconnect, which allows a wide range of safety, economy and convenience features to be implemented using software. Software, however, may be prone to malicious attacks due to injections of malicious software, such as a virus. Moreover, since the CAN bus is limited in bandwidth, a low resource intensive security mechanism is needed to detect malicious attacks.

Accordingly, there is a need for a system and a method for notifying a user or a service provider of malicious attacks on the CAN bus within a vehicle.

SUMMARY

In general, one aspect of the subject matter described in this disclosure may be embodied in a threat forensics platform. The threat forensics platform includes a memory. The memory is configured to store a baseline model of controller area network (CAN) data. The threat forensics platform includes a processor coupled to the memory. The processor is configured to obtain CAN data including multiple messages. The processor is configured to compare the CAN data including the multiple messages with the baseline model of the CAN data. The processor is configured to determine a threat score for the CAN data based on the comparison and determine that there is a threat within the CAN data based on the threat score. The processor is configured to provide an indication that there is the threat to a driver of a vehicle or to a service provider.

These and other embodiments may optionally include one or more of the following features. The processor may be configured to determine that the threat score is greater than or equal to a threshold value and provide the indication that there is the threat to the driver of the vehicle or to the service provider in response to determining that the threat score is greater than or equal to the threshold value. The processor may be configured to determine that a message of the multiple messages does not have a message identifier and determine the threat score for the CAN data further based on the determination that the message does not have the message identifier.

The baseline model may include a baseline pattern. The processor may be configured to determine one or more patterns of the multiple messages and compare the one or more patterns with the baseline pattern. The CAN data may include multiple categories and each message may be in a single category. The baseline model may have ranges of values for the different categories. The processor may be configured to determine that a message of the multiple messages is of a category and has a value that exceeds a corresponding range of values associated with the category. The processor may be configured to determine the threat score further based on the determination that the value of the message exceeds the corresponding range of values.

In another aspect, the subject matter may be embodied in a threat detection apparatus for a vehicle. The threat detection apparatus includes a memory configured to store a baseline model of controller area network (CAN) data. The threat detection apparatus includes a processor coupled to the memory. The processor unit is configured to determine that malicious activity is occurring on the CAN bus based on a comparison of the baseline model with the CAN data. The processor is configured to notify a driver of the vehicle that there is malicious activity based on the determination that the malicious activity is occurring on the CAN bus.

In another aspect, the subject matter may be embodied in a method for detecting malicious activity. The method includes obtaining, by a processor, controller area network (CAN) data including multiple messages. The method includes comparing, by the processor, the CAN data including the multiple messages with a baseline model of the CAN data. The method includes determining, by the processor, a threat score for the CAN data based on the comparison. The method includes determining, by the processor, that there is a threat within the CAN data based on the threat score and providing, by the processor, an indication that there is a threat to a driver of a vehicle or to a service provider.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for detecting malicious attacks on the CAN bus and notifying a user or service provider of the malicious attack. Particular embodiments of the subject matter described in this disclosure may be implemented to realize one or more of the following advantages. The malicious threat detection system ("threat detection system") monitors data on the CAN bus, which is a bus system used to communicate among the different electronic control units (ECUs) within the vehicle. The threat detection system monitors data across the CAN bus for malicious activity. The threat detection system monitors the data to identify or detect various signatures of malicious activities, such as a virus, malware, spyware or other malicious attack. Once the threat detection system identifies or detects an irregularity, the threat detection system notifies a user and/or a service provider of the malicious activity, which provides a real-time indication that someone may have maliciously attacked the vehicle software. This allows the user and/or the service provider to quarantine or otherwise remedy the affected areas of the software, study the malicious activity and provide an update or patch to prevent the malicious activity in the vehicle and in other vehicles.

For example, many over-the-counter (OTC) devices are installed in vehicles. Malicious parties may circumvent security mechanisms on the OTC devices to inject or insert threats onto the CAN bus. In another example, an auto shop or dealership may insert an invasive program that inserts threats onto the CAN bus. In another example a customer may lend their vehicle to a third party for ride-sharing, which exposes the vehicle to malicious activities by another party. The threat detection system analyzes CAN data on the CAN bus to detect these threats and notify or alert a service provider, driver or other entity of any threats to mitigate any consequences of the malicious activity.

Other benefits and advantages include the capability to collect data of different malicious activities that occur and perform forensic analysis on the collected data. By performing forensic analysis on collected data from multiple different sources, the threat detection system may infer, extrapolate or otherwise determine commonalities and patterns of the malicious activity, which may assist in identifying the origin of the malicious activities. Additionally, by collecting large amounts of CAN data, the threat detection system may more easily develop and distribute countermeasures to detect, prevent, mitigate or otherwise reduce the consequences of the malicious activity.

Figure 1:
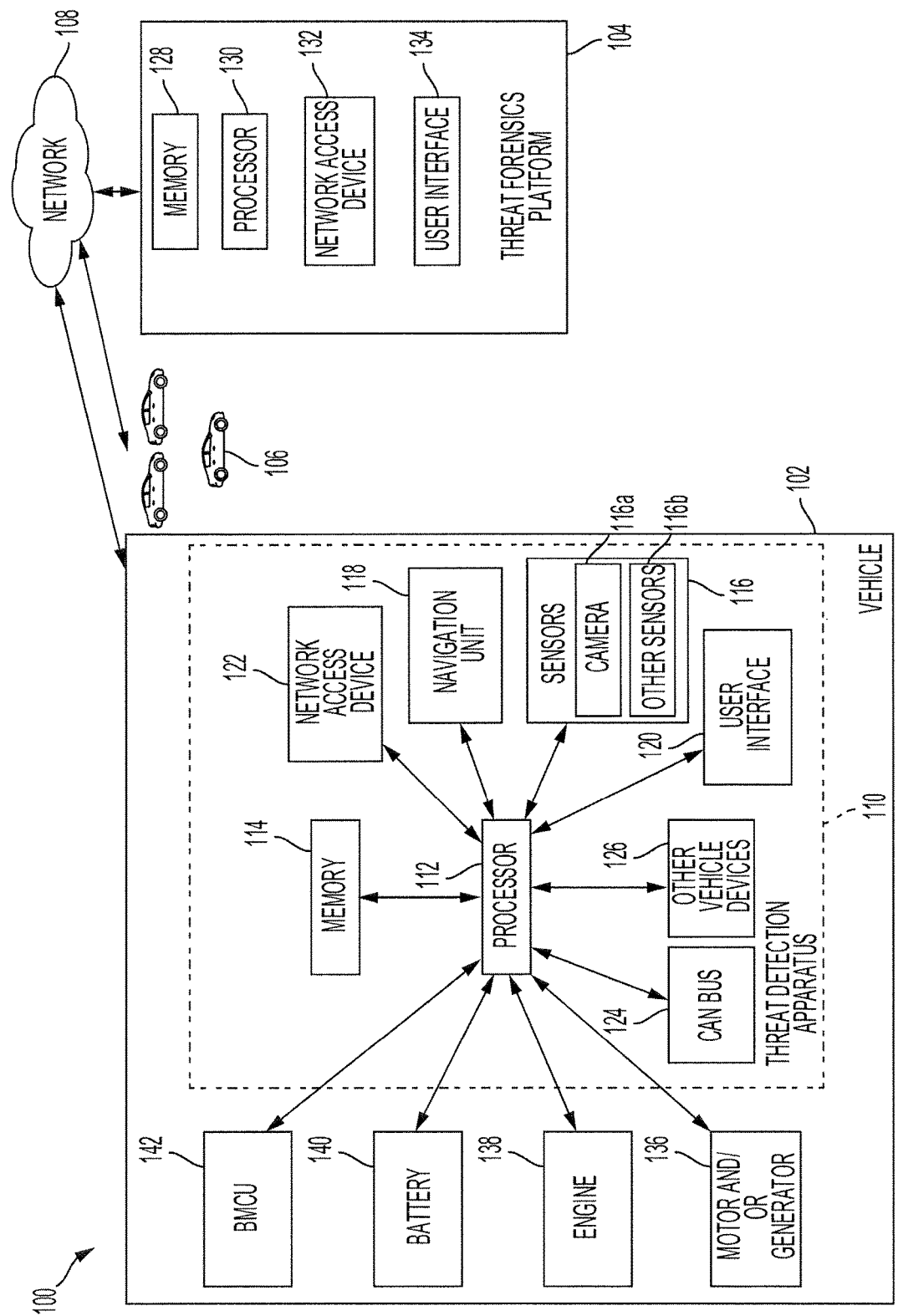
FIG. 1 is a block diagram of an example threat detection system according to an aspect of the invention.

FIG. 1 is a block diagram of a threat detection system 100. The threat detection system 100 may include a threat detection apparatus 110 and/or a threat forensics platform 104. The threat forensics platform 104 may be a separate platform coupled to the threat detection apparatus 110 and/or its functions may be included within the threat detection apparatus 110. The threat detection system 100 may be retrofitted, coupled to, include or be included within a vehicle 102. The threat detection system 100 may couple, connect to, or include one or more other devices 106, such as another vehicle, personal device, a traffic infrastructure device or other device. The threat detection system 100 may have a network 108 that links the threat forensics platform 104, the threat detection apparatus 110 and/or the one or more other devices 106. The network 108 may be a local area network (LAN), a wide area network (WAN), a cellular network, the Internet, or combination thereof, that connects, couples and/or otherwise communicates among the vehicle 102, the one or more other devices 106, the threat detection apparatus 110 and/or the threat forensics platform 104.

The threat detection system 100 collects controller area network (CAN) data from the CAN bus 124, analyzes the CAN data, detects whether there is malicious activity occurring on the CAN bus 124 and notifies, alerts or otherwise informs a driver, another driver, the police, a dealership or another service provider or entity of the malicious activity. The CAN data includes data from various controllers, actuators, electronic control units and/or other vehicle devices.

Moreover, the threat detection system 100 may use artificial intelligence including a machine learning algorithm to identify and detect malicious activity from the CAN data. By collecting the CAN data from multiple sources over time and establishing baselines using the collected data, the threat detection system 100 may improve the accuracy and precision of the detection and identification of malicious activity.

The threat detection apparatus 110 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The threat detection apparatus 110 includes one or more processors 112, such as an electronic control unit (ECU), and a memory 114. The threat detection apparatus 110 may include or be coupled to other components, such as a navigation unit 118, one or more sensors 116 or a network access device 122, a user interface 120, a controller area network (CAN) bus 124 and/or other vehicle devices 126. The threat detection apparatus 110 may couple, connect to, and/or include one or more vehicle components such as the motor and/or generator 136, the engine 138, the battery 140, and/or the battery management control unit (BMCU) 142. The threat detection apparatus 110 may not necessarily include the other components and/or the vehicle components, but rather, the threat detection 110 may be coupled to the other components and/or the vehicle components. Thus, since the threat detection apparatus 110 utilizes existing components within the vehicle 102, this reduces the cost to manufacture the vehicle 102.

The one or more processors 112 may be implemented as a single processor or as multiple processors. The processor may be electrically coupled to some or all the other components within the vehicle 102. The processor may include one or more controllers designed for collecting and analyzing data to identify, detect and/or determine malicious activity, and in response, act to prevent, warn or otherwise mitigate consequences of the malicious activity. The processor 112 may be coupled to a memory 114 and execute instructions that are stored in the memory 114.

Similarly, the threat forensics platform 104 has one or more processors 130, which may be implemented as a single processor or as multiple processors. The one or more processors 130 are designed for collecting and analyzing data to identify, detect and/or determine malicious activity, and in response, act to prevent, warn or otherwise mitigate consequences of the malicious activity. The processor 112 and/or the one or more processors 130 may generate or obtain predictive baseline models ("baseline") and use machine learning algorithms to improve the detection and/or identification of malicious activity. The malicious activity may be an injected message, virus, spyware, malware or other foreign code, message or data, which interferes with the normal operation of one or more devices or components of the vehicle 102.

The threat detection apparatus 110 and/or the threat forensics platform 104 may have a memory 114, 128, respectively. The memory 114, 128 may be coupled to the processor 112 or the processor 130 and store instructions that the processor 112 or processor 130, respectively, executes. The memory 114 may store an edge version of the baseline model, which may be obtained from the threat forensics platform 104 and used to detect and/or identify malicious activity that affects critical components or devices of the vehicle 102. The edge version of the baseline model may be a slimmed-down, less resource-intensive version of the baseline model, which focuses on the detection and/or identification of malicious activity within the CAN data that affects critical components or devices. Thus, the threat detection system 100 may detect malicious activity of a critical nature locally on the threat detection apparatus 110 using the edge version of the baseline model.

The memory 128 may store the CAN data received from the threat detection apparatus 110 and the baseline model. The baseline model may be a complete and updated version of the known threats to be used by the threat detection system 100 to detect and/or identify the malicious activity within the CAN data.

The memory 114, 128 may include one or more of a Random Access Memory (RAM) or other volatile or non-volatile memory. The memory 114, 128 may be a non-transitory memory or a data storage device, such as a hard disk drive, a solid-state disk drive, a hybrid disk drive, or other appropriate data storage, and may further store machine-readable instructions, which may be loaded and executed by the processor 112 or processor 130. Moreover, the memory 114, 128 may be used to store image data and/or other forensic data related to the malicious activity.

The threat detection apparatus 110 and/or threat forensics platform 104 may include a user interface 120, 134, respectively. The threat detection apparatus 110 and/or threat forensics platform 104 may display one or more notifications on the user interface 120, 134. For example, the one or more notifications may be an alert that indicates that a malicious attack is occurring to one or more devices or components of the vehicle 102. The alert may indicate the device that is under attack and/or other information including a type of malicious attack that is occurring. The alert may provide suggestions, recommendations and/or guidance, such as an indicator to take the vehicle 102 to a service provider. Moreover, the user interface 120, 134 may display a route or updated route of a path of the vehicle 102. The route or uprated route may indicate the closest dealership or service provider to assist in mitigating the malicious attack.

The user interface 120,134 may include an input/output device that receives user input from a user interface element, a button, a dial, a microphone, a keyboard, or a touch screen. For example, the user interface 120, 134 may receive user input that may include configurations as to the amount of image data or the types of data to include when reporting the malicious activity. The user interface 120, 134 may provide an output to an output device, such as a display, a speaker, an audio and/or visual indicator, or a refreshable braille display.

The threat detection apparatus 110 and/or the threat forensics platform 104 may have one or more network access devices 122, 132, respectively. The one or more network access devices 122, 132 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 122, 132 may transmit data to and receive data from the different components of the threat detection system 100 including the vehicle 102, the threat detection apparatus 110, the one or more other devices 106 and/or the threat forensics platform 104. For example, the processor 112 may communicate with the threat forensics platform 104 to obtain an edge version of the baseline model of the threats, via the network 108. The threat detection system 100 may use the baseline model to identify or determine malicious activities.

The threat detection system 100 may include a navigation unit 118 and/or one or more sensors 116. The navigation unit 118 may be integral to the vehicle 102 or a separate unit coupled to the vehicle 102, such as a personal device with navigation capabilities. When the navigation unit 118 is separate from the vehicle 102, the navigation unit 118 may communicate with the vehicle 102 via the network access device 122. The vehicle 102 may include a Global Positioning System (GPS) unit (not shown) for detecting location data including a current location of the vehicle 102 and date/time information instead of the navigation unit 118. In that regard, the processor 112 may perform the functions of the navigation unit 118 based on data received from the GPS unit. At least one of the navigation unit 118 or the processor 112 may predict or propose a route set that includes a starting location and a destination location. The navigation unit 118 or the processor 112 may perform navigation functions. Navigation functions may include, for example, route and route set prediction, providing navigation instructions, and receiving user input such as verification of predicted routes and route sets or destinations. Other information, such as a current speed of the vehicle 102 and/or a current direction of travel of the vehicle 102, may be extrapolated, interpreted or otherwise calculated from the data obtained from the navigation unit.

The navigation unit 118 may provide and/or obtain navigational map information including location data, which may include a current location, a starting location, a destination location and/or a route between the starting location or current location and the destination location of the vehicle 102. The navigation unit 118 may include a memory (not shown) for storing the route data. The navigation unit 118 may receive data from other sensors capable of detecting data corresponding to location information. For example, the other sensors may include a gyroscope or an accelerometer.

The one or more sensors 116 may include a camera 116a or other sensors 116b. The other sensors 116b may include a vehicle speed sensor, a steering wheel sensor, a proximity sensor, a brake sensor and/or an acceleration sensor. Other examples of sensors may include a light detection and ranging (LIDAR) device and/or a radar device. The camera 116a may capture image data. For example, when the threat detection system 100 identifies or detections a malicious activity, the camera 116a may capture image of the surrounding area of the vehicle 102 to include in the notification so that a user may identify any suspicious activity at the time of the malicious activity.

The one or more other sensors 116b may include a vehicle speed sensor. The vehicle speed sensor may measure the amount of rotation of the multiple wheels to determine whether the vehicle 102 is in motion and/or the speed of the vehicle 102. Other sensors 116b may include a steering wheel sensor, a proximity sensor, a brake sensor and/or an acceleration sensor. The steering wheel sensor may measure the amount and rate of change of the steering. The proximity sensor may measure a relative distance or detect objects within a threshold distance of the vehicle 102. The brake sensor may measure an amount of depression and/or a rate of depression of a brake pedal of the vehicle 102. The acceleration sensor may measure an amount of depression and/or a rate of depression of an accelerator pedal of the vehicle 102.

Figure 2:
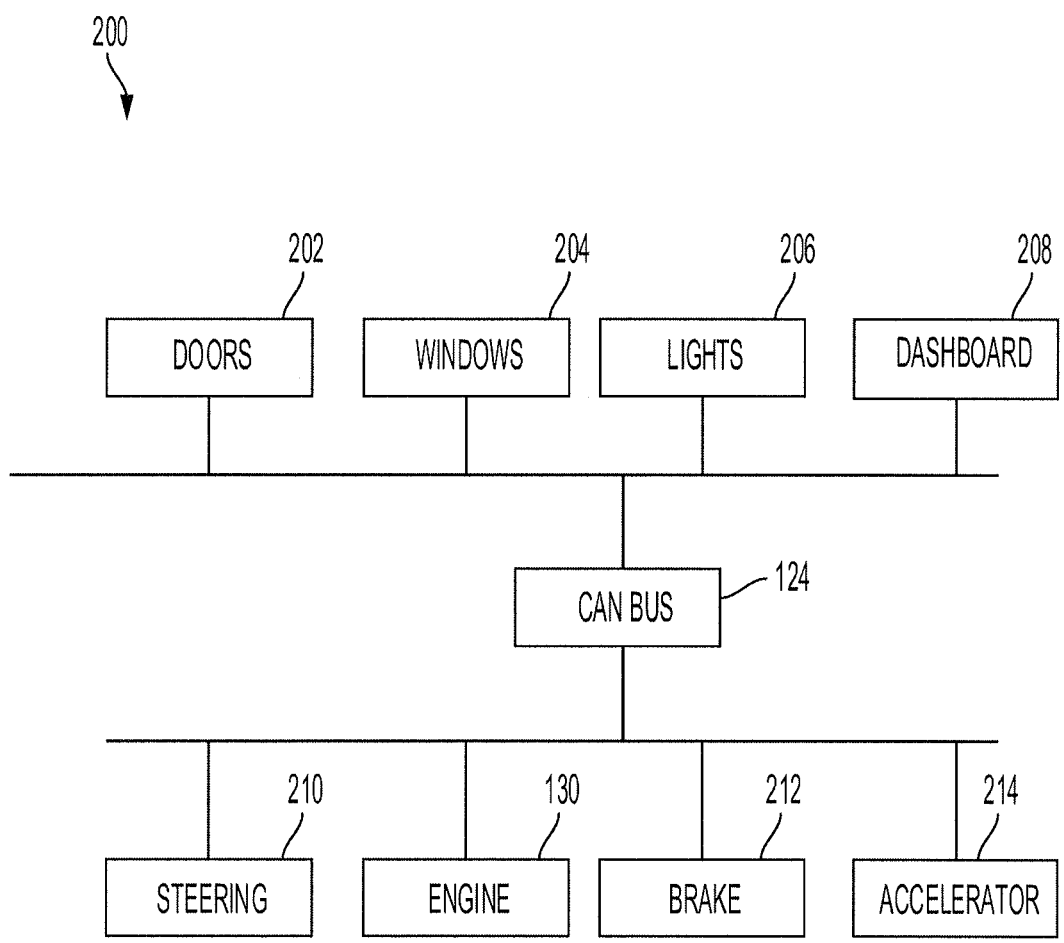
FIG. 2 is a block diagram of the controller area network (CAN) bus of the vehicle, which connects various devices that provide the CAN data according to an aspect of the invention.

The one or more sensors 116 may provide data along the controller area network (CAN) bus 124. The CAN bus 124 allows various microcontrollers, actuators, and/or the components of the vehicle 102 including other vehicle devices 126 to communicate with one another. FIG. 2 further describes the various other vehicle devices 126 that may be connected and/or provide data (or CAN data) along the CAN bus 124.

The threat detection system 100 may couple, connect to, and/or include one or more vehicle components. The one or more vehicle components may include a motor and/or generator 136. The motor and/or generator 136 may convert electrical energy into mechanical power, such as torque, and may convert mechanical power into electrical energy. The motor and/or generator 136 may be coupled to the battery 140. The motor and/or generator 136 may convert the energy from the battery 140 into mechanical power, and may provide energy back to the battery 140, for example, via regenerative braking. The vehicle 102 may include one or more additional power generation devices such as the engine 138 or a fuel cell stack (not shown). The engine 138 combusts fuel to provide power instead of and/or in addition to the power supplied by the motor and/or generator 136.

The battery 140 may be coupled to the motor and/or generator 136 and may provide electrical energy to and receive electrical energy from the motor and/or generator 136. The battery 140 may include one or more rechargeable batteries.

The BMCU 142 may be coupled to the battery 140 and may control and manage the charging and discharging of the battery 140. The BMCU 142, for example, may measure, using battery sensors, parameters used to determine the state of charge (SOC) of the battery 140. The BMCU 142 may control the battery 140.

FIG. 2 is a block diagram of the controller area network (CAN) bus 124 of the vehicle 102, which interconnects various devices that provide the CAN data. The CAN bus 124 couples the one or more vehicle components of the vehicle 102 including the one or more other vehicle devices 126. The one or more other vehicle devices 126 may include one or more doors 202, one or more windows 204, the one or more lights 206 and/or the dashboard 208. The one or more other vehicle devices 126 may also include the steering 210, the engine 138, the brake 212 and/or the accelerator 214. Each of the one or more vehicle devices 126 may be connected or coupled to a sensor, an electronic control unit or other controller or microcontroller, which communicates with the other sensors, other electronic control units or other controllers or microcontrollers.

For example, a controller or actuator connected to the one or more doors 202, windows 204, lights 206 and/or dashboard 208 may send messages or commands to unlock or lock the one or more doors 202, turn on or off the lights 206, open or close the windows 204 and/or turn on, turn off or otherwise adjust indicators on the dashboard 208. In another example, one or more sensors connected to the steering 210, the engine 138, the brake 212 and/or the accelerator 214 may send messages or commands that control or indicate the angle of the steering 210, control or indicate the state of the engine 138, and/or control or indicate the rate or amount of brake depression of the brake 212 and/or the accelerator 214.

Figure 3:
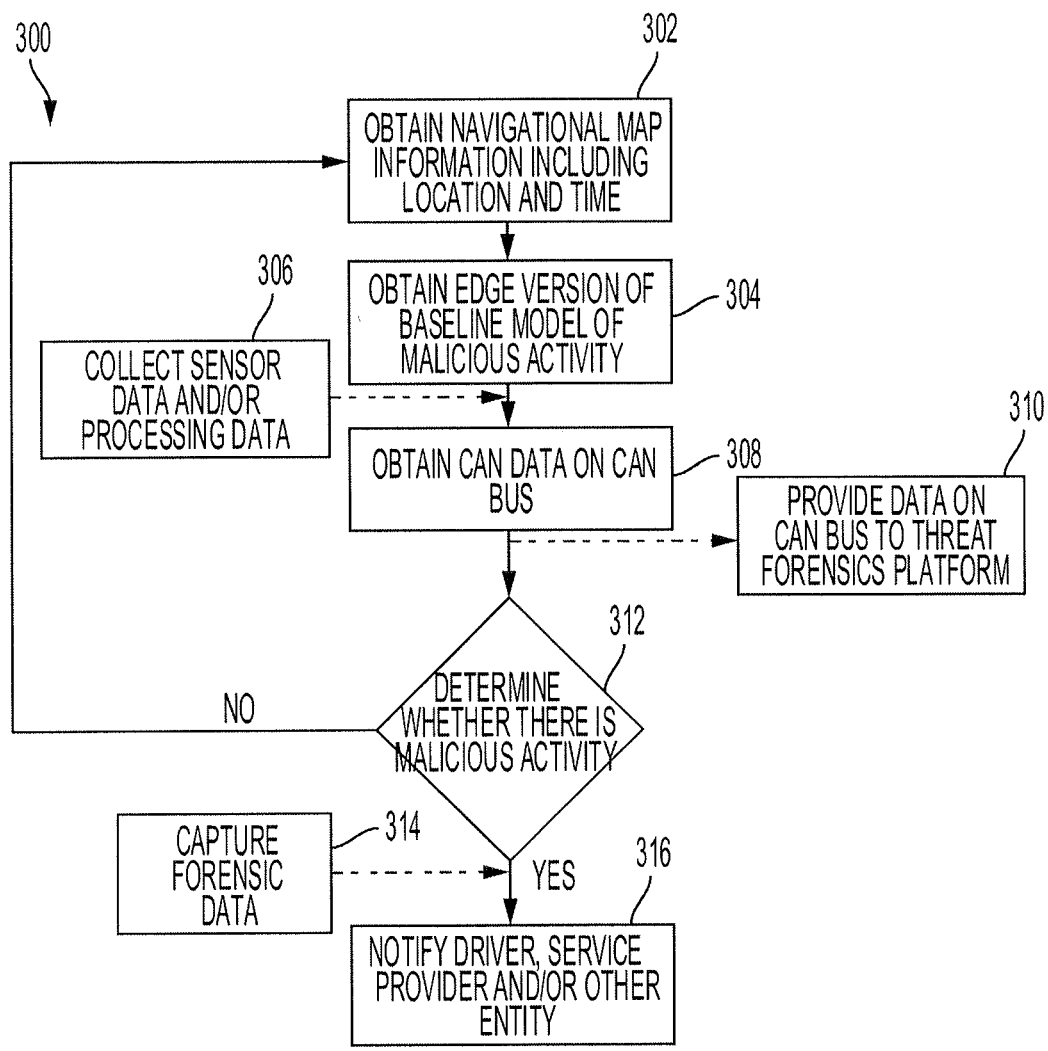
FIG. 3 is a flow diagram of an example process for edge detection and notification of malicious activity on the threat detection apparatus of the threat detection system of FIG. 1 according to an aspect of the invention.

FIG. 3 is a flow diagram of a process 300 for detecting and/or identifying malicious attacks or other malicious activity on the vehicle 102. One or more computers or one or more data processing apparatuses, for example, the processor 112 of the threat detection apparatus 110 of the threat detection system 100 of FIG. 1, appropriately programmed, may implement the process 300.

The threat detection system 100 using the threat detection apparatus 110 obtains navigational map information (302). The threat detection apparatus 110 may use the navigation unit 118 to obtain the navigational map information. The navigational map information may include the current location of the vehicle 102 and/or the current time. The current location and the current time may be used to timestamp forensic data and/or the CAN data so that threat detection system 100 may identify corresponding or common factors among the detected malicious activity within the CAN data from multiple other devices 106 that have similarly been maliciously attacked.

The threat detection apparatus 110 may provide a request to obtain an edge version of the baseline model to the threat forensics platform 104 (303). When the threat detection apparatus 110 sends a request to obtain the baseline model, the request may contain the type of vehicle, VIN, the location of the vehicle and/or other information that may tailor the edge version of the baseline model to the vehicle 102. In response, the threat forensics platform 104 may provide an edge version of the baseline model that is tailored to the request. For example, the baseline steering range of values may be different for a truck than for a sedan or a cross-over. Moreover, the baseline steering range of values may be different when the sedan is traveling on windy roads swerving around a mountain than when the sedan is on a straight bridge or roadway. In another example, the baseline suspension range of values may be different when the vehicle 102 is traveling on a dirt path than when the vehicle 102 is traveling on a highway.

The threat detection apparatus 110 may obtain an edge version of the baseline model of malicious activity (304). The threat detection apparatus 110 may obtain the edge version of the baseline model from the threat forensics platform 104. The edge version of the baseline model may incorporate malicious activity that targets critical functions of the vehicle 102, such as the engine 138, the steering 210, the brake 212 and/or the accelerator 214. By being a slimmed down version, the edge version of the baseline model may be less resource intensive, e.g. requiring less memory for storage and/or less processing power to execute. Since the edge version of the baseline model may be stored in the memory 114 and executed by the processor 112, the threat detection apparatus 110 may compare or analyze the CAN data against the edge version of the baseline model, locally.

The threat detection apparatus 110 collects sensor data and/or processing data (306). The threat detection apparatus 110 may use one or more sensors 116 to collect the sensor data. The threat detection apparatus 110 may obtain the processing data from the one or more vehicle components including the one or more other vehicle devices 126 on the CAN bus 124. The sensor data and/or the processing data may be communicated between the controllers, actuators, components and devices along the CAN bus 124.

The threat detection apparatus 110 obtains the collected sensor data and/or processing data on the CAN bus 124 (308). The CAN bus transmits and communicates among the interconnected components along the CAN bus 124, which provides a communication pathway among the interconnected components and the vehicle devices 126.

Once the CAN bus 124 receives or obtains collected sensor data and/or processing data, the threat detection apparatus 110 may provide the CAN data that includes the sensor data and/or processing data to the threat forensics platform 104 for analysis (310). The threat detection apparatus 110 may send the CAN data to the threat forensics platform 104 across the network 108 using the network access device 122 and obtain an indication of any malicious attacks or activity. The threat detection apparatus 110 may send the current location of the vehicle 102 and the current time along with the CAN data so that the threat forensics platform 104 may correlate, compare and/or otherwise cross-reference the CAN data across multiple vehicles to identify any patterns or relationships within the CAN data from the multiple vehicles. The threat forensics platform 104 may perform the analysis of the CAN data to determine the presence of malicious activity. The threat detection apparatus 110 may receive an indication of malicious activity from the threat forensics platform 104 if any malicious activity is detected.

The threat detection apparatus 110 determines whether there is malicious activity on the CAN bus 124 (312). The threat detection apparatus 110 may obtain the edge version of the baseline model of malicious activity from the memory 114 and use the baseline model to detect or identify malicious activity within the CAN data. The threat detection apparatus 110 may perform checks like those of the threat forensics platform 104 on a smaller subset of critical commands and/or messages, such as messages between critical components of the vehicle 102. For example, the threat detection apparatus 110 may check message identifiers on the critical commands and/or messages to ensure that there is a message identifier on each message of the multiple messages on the CAN bus and that the message identifier conforms to an expected format for the CAN data. In another example, the threat detection apparatus 110 may check that that the values of the message for the critical components, such as the steering 210, the engine 138, the brake 212 and/or the accelerator 214 are within a threshold. The threshold may be determined by the edge version of the baseline model, such as a baseline range of values. This ensures that the vehicle 102 is traveling within a range of expected speeds and direction and is in a minimum operating state. In another example, the threat detection apparatus 110 may ensure that the frequency and patterns of the critical commands and/or messages are occurring within a threshold frequency and/or pattern. This ensures that the controllers, electronic control units or other processors and/or devices are not flooded with messages that utilize the limited resources. These checks may be similar to those employed by the threat forensics platform 104, which are further described in detail with respect to the process 300 in FIG. 3 described below.

In some implementations, the threat detection apparatus 110 relies completely on the threat forensics platform 104 to perform the analysis for malicious activity. The threat detection apparatus 110 may have sent the CAN data to the threat forensics platform 104, and in response, waits for the results of the analysis from the threat forensics platform 104. The threat detection apparatus 110 may receive or obtain an indication that there is a malicious threat or activity within the CAN data. Then, the threat detection apparatus 110 may determine that there is malicious activity based on the indication.

If the threat detection apparatus 110 does not detect or determine that there is malicious activity within the CAN data, the threat detection apparatus 110 may continue to collect data and monitor the CAN data on the CAN bus 124 for malicious activity. Otherwise, the threat detection apparatus 110 alerts the driver, another driver of another vehicle, the police and/or another entity or service provider that there is malicious activity within the CAN data.

When the threat detection apparatus 110 determines that there is a threat of malicious activity, the threat detection apparatus 110 may capture additional forensic data to document the threat so that a service provider, a user or other individual may determine the source of the malicious activity (314). The threat detection apparatus 110 may use various sensors including one or more cameras 116a, which may be internal and/or external to the vehicle 102, and/or one or more other sensors 116, such as a radar or lidar device, to capture the additional forensic data. The threat detection apparatus 110 may use the camera 116a to capture image data of the surrounding environment of the vehicle 102. For example, the camera 116a may be used to capture and record the position, location and/or actions of a person surrounding the vehicle 102 when the malicious activity is detected, and thus, the image data may capture the suspected person that injected or otherwise employed the malicious activity. In another example, the threat detection apparatus 110 may determine the type of malicious activity and/or the type of messages on the CAN data that are infected or modified. This information may be used to identify the one or more other vehicle devices 126 that are suspected of being attacked. Other forensic data may include the frequency of the malicious activity, the timing of the malicious activity, the location of the vehicle 102 when the malicious activity is detected and/or other factors, such as the state of the various other vehicle devices 126 when the malicious activity is detected. The forensic data may be used by the threat detection platform 104 to determine any relationships or patterns of the malicious activity among the multiple other devices 106, such as the other vehicles, to assist in determining the source of the malicious activity and to administer a preventive action to mitigate consequences of the malicious activity.

The threat detection apparatus 110 may notify the driver, another user and/or a service provider, such as an authorized dealership or repair shop, that there is malicious activity on the CAN bus 124 (316). By alerting the driver of the malicious activity, the driver is given the opportunity to rectify the problem, such as by taking the vehicle 102 into the repair shop or otherwise stop driving to prevent the malicious activity from compromising operation of the vehicle 102. By alerting the service provider of the malicious activity, the service provide may issue a service alert so that other drivers may be aware of the malicious activity. Moreover, the service provider may patch or fix the malicious activity. In some implementation, the service provider may use the threat forensics platform 104 to push a software patch to the vehicle 102 and/or other vehicles. The threat detection apparatus 100 may warn other drivers of the threat so that the other driver may avoid the area of malicious activity or may alert a government entity, such as the police, of the location of the malicious activity to assist law enforcement.

The notification may include additional information including the location, type of malicious activity and/or the one or more vehicle components or other vehicle devices 126 that are affected by the malicious activity. The notification may include a recommendation, suggestion or course of action for the driver. For example, the notification may inform the user to stop operation of the vehicle 102, direct the user to the closest service provider and/or notify the driver or the service provider to update the software at the next service appointment.

The notification may account for the type of malicious activity and the type of system or component that the malicious activity impacts. If the malicious activity impacts the engine 138, the steering 210, the brake 212, the accelerator 214 or other critical component, the threat detection apparatus 110 may instruct the driver to stop operation of the vehicle 102 and/or immediately go to a service provider to avoid an accident, for example. If the malicious activity impacts the doors 202, the windows 204, the lights 206, the dashboard 208 or other less critical component, the threat detection apparatus 110 may inform the driver to correct the malicious activity at the next service appointment, for example. In some implementations, the threat detection apparatus 110 may take corrective action or mitigate the consequences of the malicious activity by quarantining the affected components and/or vehicle devices 126.

Figure 4:
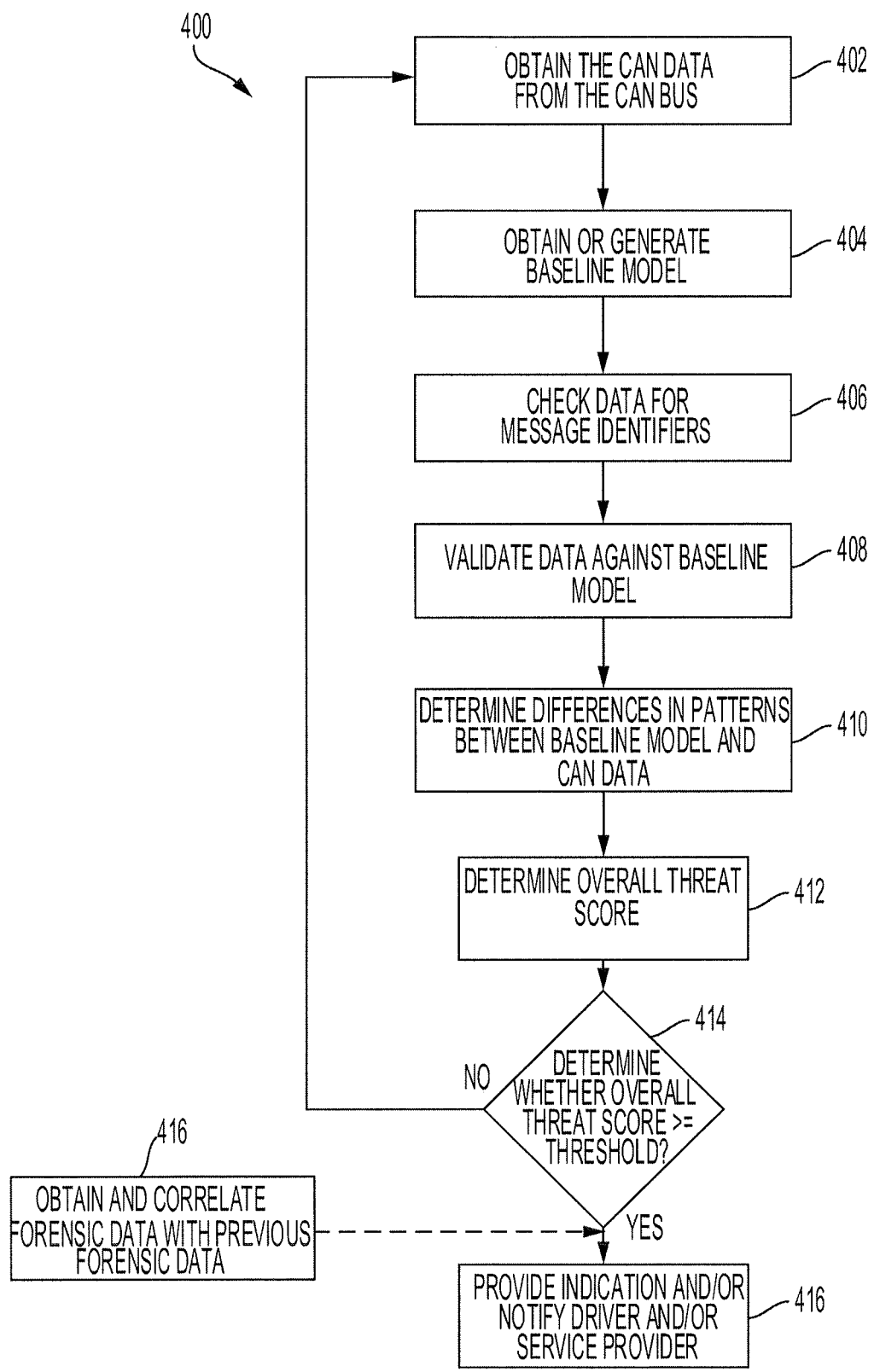
FIG. 4 is a flow diagram of an example process for the main detection and notification of malicious activity using the threat forensics platform of the threat detection system of FIG. 1 according to an aspect of the invention.

FIG. 4 is a flow diagram of a process 400 for the main detection and notification of malicious activity. One or more computers or one or more data processing apparatuses, for example, the one or more processors 130, appropriately programmed, may implement the process 400.

The threat forensics platform 104 may obtain the CAN data from the CAN bus 124 (402). The threat forensics platform 104 may receive the CAN data from the threat detection apparatus 110 on the vehicle 102. Moreover, other information including the type of vehicle, a vehicle identifier, a current location of the vehicle 102 and/or a current time of day may be included along with the CAN data to facilitate analysis of the CAN data. The other information may be used to select the appropriate baseline model to compare with the obtained CAN data.

Figure 5:
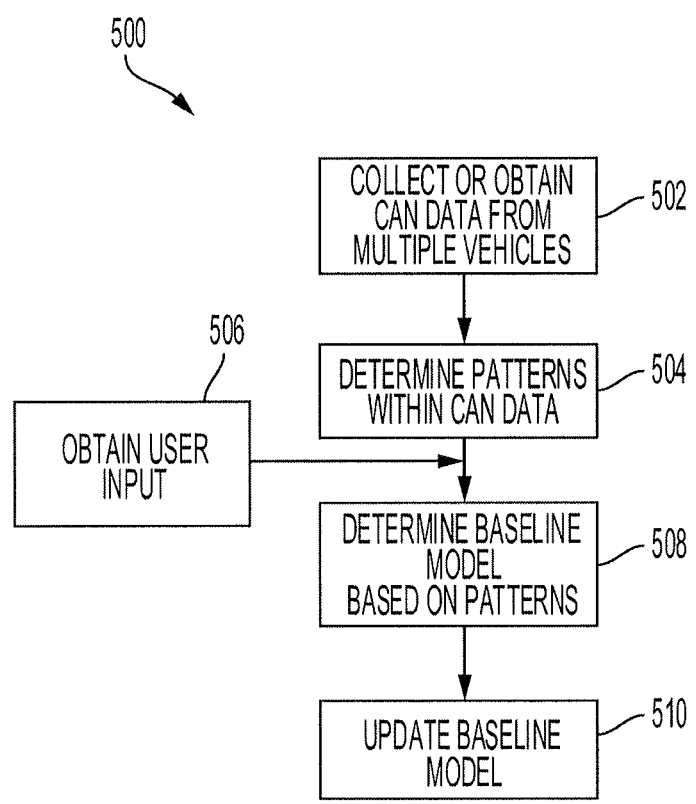
FIG. 5 is a flow diagram of an example process for generating, establishing or otherwise determining a baseline model using the threat detection system of FIG. 1 according to an aspect of the invention.

The threat forensics platform 104 obtains or generates the baseline model (404). The threat forensics platform 104 may select a baseline model from the memory 128 that corresponds with the other information. For example, the threat forensics platform 104 may select the baseline model that is specific to the type of vehicle and location of where the CAN data was obtained. In some implementations, the threat forensics platform 104 may generate the baseline model in real-time. FIG. 5 further describes the process 500 for generating or establishing the baseline model.

Once the threat forensics platform 104 has obtained or generated the baseline model, the threat forensics platform 104 may compare the CAN data to the baseline model and perform various checks on the CAN data to determine whether there is malicious activity within the CAN data. The threat forensics platform 104 may perform these checks in any order to determine a threat score, which indicates the overall level of malicious activity within the CAN data.

The threat forensics platform 104 may check the CAN data for message identifiers (406). The CAN data includes multiple messages and within each message the message has to be properly formatted. The format of each message may be specific to each category of messages. For example, the format of a control message to open or lock a door may be different than the format of a control message to open or close a window.

Regardless of the type of message, the threat forensics platform 104 may require that the message have a message identifier. And so, the threat forensics platform 104 may check each of the message within the CAN data for the message identifier. The threat forensics platform 104 may parse each message of the CAN data and determine whether there is a message identifier by checking the bits in a particular position in the message. The message identifier may identify a device that ingests or processes the message. The threat forensics platform 104 may check that the message identifier has the correct identifier for the destination device that uses the message. For example, the message identifier may indicate a destination for a message, such as a particular device like the door 202 or the window 204.

The threat forensics platform 104 may validate the CAN data against the baseline model (408). The CAN data includes multiple messages of different categories for different vehicles. The threat forensics platform 104 may extract values from each message and compare the value to a corresponding baseline range of values for the particular category. The different categories may include control messages, alert messages, health checks, command messages, processing messages and/or other messages including low-level commands for the different components and/or devices, health checks. Moreover, the different messages may be for different types of vehicles and obtained at different locations.

Each category of messages for the type of vehicle at a particular location may have a value that corresponds to an expected or anticipated baseline range of values that are associated with the category of the message for the vehicle at the particular location. For example, the threat forensics platform 104 may have a baseline range of values for a control message to lock and unlock a door 202 and a baseline range of values for an alert message to notify the driver on the dashboard 208.

The threat forensics platform 104 determines the category of the message and compares the value of the message to the range of values that correspond to the baseline range of values for the category of that message. For example, the threat forensics platform 104 may determine that a control message has the vehicle 102 accelerating from 0-60 mph in 2 seconds when the baseline range of values has the vehicle 102 accelerating from 0-60 mpg in 4-5 seconds, and thus, the threat forensics platform 104 may determine that the CAN data is invalid because the value of the control message exceeds that of the baseline range of values for the acceleration speed of the vehicle 102.

In another example, the threat forensics platform 104 may have a first baseline range of values for a control message for the steering 210 when the vehicle 102 is traveling on a straight highway and a second baseline range of values, which allow for more deviation from the median, for the control message for the steering 210 when the vehicle is traveling on a windy road, i.e., a different location, that requires the vehicle 102 to swerve back and forth. Thus, the value of the control message for the steering 210 may be compared to the first baseline range of values when the vehicle 102 is driving on a straight highway and the second baseline range of values when the vehicle is on the windy road.

The threat forensics platform 104 may determine differences in the message patterns of the CAN data and the baseline model (410). The baseline model may include an expected pattern, frequency and/or sequence or ordering of the messages within the CAN data to perform an operation. The threat forensics platform 104 may compare the pattern, frequency and/or sequence or ordering of each message within the CAN data with the baseline model. By checking the frequency, ordering, sequence or other characteristics, the threat forensics platform 104 protects the vehicle 102 from denial of service attacks. The threat forensics platform 104 may ensure that messages are not repeated more than a threshold number of times and follow a particular pattern or sequence to prevent over-utilization of the resources of the processor 112 of the vehicle 102.

For example, in order to unlock a door, a control message from a user interface element, such as a button is sent first to an ECU across the CAN bus 124, then a control message to unlock the door 202 may be sent to the door 202. Once the door 202 is unlocked, the subsequent message may be a control message to a light 206 when the door 202 is ajar or otherwise opened and an alert message may be sent to the dashboard 208 to indicate that the door 202 is open. The threat forensics platform 104 may recognize these sequences of messages, and if the message patterns of the CAN data deviate from the recognized sequence or is missing a message within the sequence, this may indicate malicious activity within the CAN data for the operation to open the door 202.

In another example, in order to travel a straight roadway, a single control message to the steering 210 may be sent by the ECU across the CAN bus 124. And so, if the threat forensics platform 104 detects that there are multiple different control messages to the steering 210, this may indicate that there is malicious activity within the CAN data that is causing the steering 210 to adjust back and forth. The multiple different control messages may be messages causing the vehicle 102 to swerve.

The threat forensics platform 104 determines an overall threat score (412). The threat score represents an estimate of the threat that the malicious activity or attack presents to the vehicle 102. The threat score may be representative of the amount of damage, the criticality or the nature of the malicious activity, for example. The threat forensics platform 104 may determine the threat score based on the one or more of the checks of the message identifier, the validation of the CAN data against corresponding the baseline range of values and the differences in patterns between the baseline model and the messages within the CAN data.

The threat forensics platform 104 may assign a threat score for each of the check of the message identifier, the validation of the CAN data and/or the differences in patterns. The score may be a weighted score. For example, the check of the message identifier may be weighted more than the validation of the CAN data and/or the differences in patterns, and the validation of the CAN data may be weighted more than the differences in patterns but less than the check of the message identifier. The weights may be pre-configured or assigned based on user input. The weights may be related to and reflect the priority or importance of the detection of the malicious activity.

The threat score may be based on the degree of difference. For example, as the degree of difference between the value of a control message for the steering and the baseline ranges of values increases, the threat forensics platform 104 may assign a higher score. The higher score represents the greater deviation. Similarly, in another example, as the pattern of messages of the CAN data has a greater deviation than the baseline pattern, the threat forensics platform 104 may assign a higher score. In another example, as the number of messages without a message identifier increases, the threat forensics platform 104 may assign a higher score because more missing message identifiers may correspond to a larger threat. Similarly, if the degree of difference between the values and the baseline range of values, the deviation between the pattern of messages with the baseline pattern and/or the number of messages without the message identifier is less, then the corresponding threat score is less because the threat is less, for example.

Additionally, the threat forensics platform 104 may determine the weight of the individual threat score based on the category of the message and the components and/or devices that the message affects. For example, control messages of the steering 210, engine 138, brake 212 and/or accelerator 214 affect drivability, and thus, malicious activity, which affects these devices, may have a greater weight. Whereas, alert messages for the doors 202 and/or the windows 204 may have a lesser weight less because the alert messages do not change the movement of the vehicle 102, which may lead to an accident, for example. In some implementations, the weighted score may be based on the state of the vehicle 102. For example, the score of an invalid door open message may have a higher threat score when the vehicle 102 is in motion than when the vehicle 102 is stationary.

Once each of the threat scores for the check of the message identifier, the validation of the CAN data and/or the differences in patterns is assigned, the threat forensics platform 104 may sum or total the individual threat scores to calculate and determine the overall threat score. The overall threat score represents the overall or total level of threat that the malicious activity on the CAN bus presents.

Once the overall threat score is calculated or otherwise determined, the threat forensics platform 104 may determine whether the overall threat score is greater than or equal to a threshold score (414). When the overall threat score is less than the threshold score, the threat forensics platform 104 may continue to monitor CAN data from the CAN bus 124. When the overall threat score is greater than or equal to the threshold, this may indicate that there is malicious activity on the CAN bus 124.

The threat forensics platform 104 may request from the threat detection apparatus 110 to capture forensic data including image data of the surrounding environment and/or the location and timestamp of the CAN data. The threat forensics platform 104 may obtain the forensic data and correlate the forensic data with previous sets of forensic data (416). Other forensic data from traffic infrastructure including traffic cameras, other vehicles and/or other devices 106 may be obtained to incorporate into the notification and/or to determine a source of the malicious activity, such as a nearby person with a malicious device. The threat forensics platform 104 compares the forensic data, such as the timestamp, the location and/or objects or actions of the objects within the image data, such as a person, with the forensic data previously compiled from other devices 106, such as traffic infrastructure and/or other vehicles, to determine correlations, patterns or relationships to determine an origin, source or other characteristics of the malicious activity. The threat forensics platform 104 may use machine learning to correlate the locations of reported malicious activities and/or other forensic data including the objects within the image data of the surrounding environment and path of the vehicle 102 to determine the origination point of attack and/or the source of the point of attack. This assists in identifying the means, position, location and/or suspicious person responsible for the initial attack of the first instance of the malicious activity.

The threat forensics platform 104 may provide this information in the notification to a service provider so that the service provider may conduct further analysis of the CAN data to determine the source of the malicious activity. In some implementations, the threat forensics platform 104 may incorporate the analysis to recommend to the driver to avoid a particular location where malicious activity is or has occurred. In some implementations, the threat forensics platform 104 may provide this information to law enforcement, other vehicles and/or other entities to assist the entity to prevent, avoid or otherwise mitigate consequences of the malicious activity where there is a higher-than-normal rate of malicious activity.

The threat forensics platform 104 provides an indication to the threat detection apparatus 110 to display a notification or alert and/or notifies a service provider of the malicious activity when the threat score is greater than or equal to the threshold (418). The threat forensics platform 104 may alert a user on a mobile app or via the user interface 120, 134. The notification may include recommendations or suggestions to stop operation of the vehicle or to direct the driver to the service provider, possible software updates to fix or prevent the malicious activity and/or other warning or preventive measures. The notification may also include other information including the forensic data, the type of malicious activity and/or the devices or components affected by the malicious activity so that the malicious activity may be diagnosed. When the threat forensics platform 104 provides the indication, the threat forensics platform may alert other devices 106, such as other vehicles, within the geographic area of the location of the vehicle 102 where the CAN data with the malicious activity was obtained.

FIG. 5 is a flow diagram of an example process 500 for generating, establishing or otherwise determining a baseline to use to detect or identify malicious activity. One or more computers or one or more data processing apparatuses, for example, the one or more processors 130 of the threat forensics platform 104 of the threat detection system 100 of FIG. 1, appropriately programmed, may implement the process 500. The threat forensics platform 104 may use machine learning on the collected data to learn from current threats and proactively identify and/or detect future threats. The threat forensics platform 104 continuously collects data from vehicles and other devices to formulate and refine a baseline model to detect malicious activity to continually learn of threats and/or normal behavior from the CAN data.

The threat detection system 100 may use the threat forensics platform 104 to generate the baseline model to use to detect or identify malicious attacks on the CAN bus 124. The threat forensics platform 104 collects or obtains CAN data from multiple vehicles (502). The threat detection system 100 may collect, crowd-source or otherwise obtain the CAN data from multiple vehicles. Other information may be collected, such as the location and time of when the CAN data is collected. The other information may include the type, the model or the make of the vehicle and/or a vehicle identifier, such as a VIN, so that the baseline model may be tailored to the type of vehicle or situation.

The threat forensics platform 104 determines patterns within the CAN data (504). The patterns may include the frequency, the ordering, the sequence or other characteristic, such as a value of a type of message, that is repeated a number of time greater than a threshold amount or a percentage of time greater than a threshold percentage. The CAN data may include multiple types, categories or kinds of messages. The multiple types, categories or kinds of messages may include control messages for each of the different other vehicle devices 126, such as the doors 202, the windows 204, the lights 206, the dashboard 208, the steering 210, the engine 138, the brake 212 and/or the accelerator 214 and/or one or more vehicle components.

For example, the threat forensics platform 104 may capture the frequency that a control message, such as a control message for the steering 210, occurs during a trip or at a location or a sequence or ordering of control messages between the steering 210, the engine 138, the brake 212 and/or the accelerator 214 necessary to navigate a windy road on a mountain. The patterns may be based on the location, the type of vehicle, the weather or other information specific to the type of vehicle and the current location and time.

In another example, the threat forensics platform 104 may capture the pattern of the range of values associated with the type of message for the type of vehicle, such as the control messages of the doors 202 or other devices, and if the range of values of the type of message for the type of vehicle at the location is repeated a number of times greater than the threshold amount, the threat forensics platform 104 may associate that range of values with the normal operation or baseline model.

The threat forensics platform 104 may obtain user input to establish the baseline model (506). The user input may include standardized or recommended ranges of values for different types of messages for different types of vehicles. The user input may be used as an initial range of values, which may be later updated, as the threat forensics platform 104 collects enough sample data for the different vehicles and learns based on the driving patterns of the different vehicles at different locations. Moreover, the user input may include baseline formats for the different types of messages. The formats may require, for example, a message identifier or other tag, label or marker that identifies valid messages within the CAN data.

Once the patterns are determined, the threat forensics platform establishes or determines the baseline model based on the patterns (508). When the patterns are repeated a number of times or occur in a percentage of the data collected for the location, the threat forensics platform 104 may determine that the pattern is part of the baseline model. When the threat detection system 100 detects values that deviate from the baseline model, the threat detection system 100 may identify those behaviors as malicious activity. Thus, the threat detection system 100 can learn and detect malicious activity using the baseline model.

As the threat forensics platform 104 collects more CAN data from multiple vehicles, the threat forensics platform 104 may continuously update the baseline model (510). By continuously updating the baseline model, the threat forensics platform 104 learns of baseline messages and patterns for vehicles and activities that deviate from the baseline model within the collected CAN data from the CAN bus of multiple vehicles and that may be malicious activities. For example, as a specific range of values for a control message, e.g., speed, steering, engine or doors, appears more frequently and/or is present in a larger percentage of the sample size, the threat forensics platform 104 may increase a likelihood that that the specific range of values is normal and is more likely part of the baseline model. Whereas, if the range of values for the control message appears less frequently and/or is present in a smaller percentage of the sample size, the threat forensics platform 104 may decrease a likelihood that the range of values is normal and is less likely part of the baseline model. The percentage or frequency necessary for inclusion in the baseline model may be pre-determined and/or user-configured. Thus, when the percentage or frequency necessary is exceeded, the threat forensics platform 104 updates the baseline model with the repeated pattern. The threat forensics platform 104 may receive the CAN data from multiple vehicles and be provided regular or periodic updates of the CAN data to update the baseline model. The data from the different vehicles may be weighted differently based on a confidence factor associated with the vehicle, which represents the accuracy and/or precision of the data provided by the corresponding vehicle.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A threat forensics platform, comprising:
a memory configured to store a baseline model of controller area network (CAN) data;
a camera configured to capture image data; and
a processor coupled to the memory and configured to:
obtain controller area network (CAN) data including a plurality of messages,
compare the controller area network data including the plurality of messages with the baseline model of the CAN data,
determine that a message of the plurality of messages does not have a message identifier,
determine a threat score for the CAN data based on the comparison and on the determination that the message does not have the message identifier,
determine that there is a threat within the CAN data based on the threat score,
determine a weighted score based on the threat score, wherein the weighted score increases as an amount of messages without the message identifier increases,
provide an indication that there is the threat to a driver of a vehicle or a service provider based on the weighted score, and
record, via the camera, a position, location and action of a person surrounding the vehicle when the threat is determined.

2. The threat forensics platform of claim 1, wherein the processor is configured to:
determine that the threat score is greater than or equal to a threshold value; and
provide the indication that there is the threat to the driver of the vehicle or the service provider in response to determining that that the threat score is greater than or equal to the threshold value.

3. The threat forensics platform of claim 1, wherein the baseline model includes a baseline pattern, wherein to compare the controller area network data including the plurality of messages with the baseline model of the CAN data the processor is further configured to:
determine one or more patterns of the plurality of messages; and
compare the one or more patterns of the plurality of messages with the baseline pattern.

4. The threat forensics platform of claim 1, wherein the CAN data has a plurality of categories, each message being in one category of the plurality of categories, wherein the baseline model has ranges of values for the different categories of the plurality of categories.

5. The threat forensics platform of claim 4, wherein the processor is further configured to:
determine that a message of the plurality of messages is of a category of the plurality of categories and has a value that exceeds a corresponding range of values associated with the category in the baseline model.

6. The threat forensics platform of claim 5, wherein the processor is configured to determine the threat score for the CAN data further based determination that the value of the message exceeds the corresponding range of values.

7. A threat detection apparatus for an autonomous vehicle, comprising:
a memory configured to store a baseline model of controller area network (CAN) data from a CAN bus;
a camera configured to capture image data; and
a processor coupled to the memory and configured to:
determine that malicious activity is occurring on the CAN bus based on a comparison of the baseline model with the CAN data,
determine a weighted score for the malicious activity, wherein the weighted score increases as an amount of messages within the CAN data without a message identifier increases,
notify a driver of the vehicle that there is malicious activity based on the determination of the weighted score and that malicious activity is occurring on the CAN bus, and
record, via the camera, a position, location and action of a person surrounding the vehicle when the malicious activity is determined.

8. The threat apparatus of claim 7,
wherein the processor is configured to notify a service provider that there is malicious activity, wherein the notification includes the image data.

9. The threat apparatus of claim 7, wherein the processor is configured to:
obtain the baseline model; and
compare the baseline model with CAN data on the CAN bus of the vehicle.

10. The threat apparatus of claim 9, wherein the CAN data has a plurality of messages, wherein to compare the baseline model with the CAN data on the CAN bus of the vehicle the processor is configured to:
determine one or more values of the plurality of messages; and
compare the one or more values of the plurality of messages with one or more range of values within the baseline model.

11. The threat apparatus of claim 10, further comprising:
a navigation unit is configured to obtain navigational map information including a current location of the vehicle;
wherein the processor is coupled to the navigation unit and is further configured to:
provide the current location of the vehicle to the threat forensics platform.

12. The threat apparatus of claim 7, wherein the CAN data has a plurality of messages, wherein the processor is configured to:
check each message of the plurality of messages for the message identifier; and
determine that malicious activity is occurring on the CAN bus further based on the check.

13. The threat apparatus of claim 7, wherein the processor is further configured to:
provide the CAN data on the CAN bus to a threat forensics platform; and
obtain from the threat forensics platform results of a comparison between the baseline model with the CAN data.

14. A method for detecting malicious activity, comprising:
obtaining, by a processor of a threat forensics platform, a first set of controller area network (CAN) data from a plurality of vehicles;
generating, by the processor of the threat forensics platform, a baseline model based on the first set of CAN data;
obtaining, by a processor of the threat forensics platform, a second set of CAN data including a plurality of messages;
comparing, by the processor of the threat forensics platform, the second set of CAN data with the baseline model;
determining, by the processor of the threat forensics platform, a threat score for the second set of CAN data based on the comparison;
determining, by the processor of the threat forensics platform, that there is a threat within the second set of CAN data based on the threat score;
determining a weighted score for the threat score, wherein the weighted score increases as an amount of messages within the second set of CAN data without a message identifier increases;
causing, by the processor of the threat forensics platform, a processor of the threat detection apparatus to send an indication that there is a threat to a driver of a vehicle, to other drivers of other vehicles or to another entity including law enforcement or a service provider based on the weighted score; and
recording, via a camera, a position, location and action of a person surrounding the vehicle when the threat is determined.

15. The method of claim 14, further comprising:
obtaining, from traffic infrastructure, forensic data including a location of the vehicle where the threat was detected;
wherein the indication includes the location of the vehicle where the threat was detected.

16. The method of claim 14, further comprising:
checking each message of the plurality of messages for the message identifier; and
determining the threat score for the second set of CAN data further based on the check of each message.

17. The method of claim 14, wherein the second set of CAN data has a plurality of categories, each message being in one category of the plurality of categories, wherein the baseline model has ranges of values for the different categories of the plurality of categories.

18. The method of claim 17, further comprising:
determining that a message of the plurality of messages is of a category of the plurality of categories and has a value that exceeds a corresponding range of values associated with the category in the baseline model.

19. The method of claim 18, wherein determining the threat score for the second set of CAN data is further based the determination that the value of the message exceeds the corresponding range of values.

* * * * *